United States Patent
Park et al.

(10) Patent No.: US 8,262,324 B2
(45) Date of Patent: Sep. 11, 2012

(54) CUTTING INSERT WITH PROTRUSIONS FORMED AT CORNER AREA THEREOF

(75) Inventors: Hong Sik Park, Daegu (KR); Ho-Hyoun Cho, Daegu (KR)

(73) Assignee: TaegiTec, Ltd., Daegu (KR)

( * ) Notice: Subject to any disclaimer, the term of this patent is extended or adjusted under 35 U.S.C. 154(b) by 129 days.

(21) Appl. No.: 12/666,436

(22) PCT Filed: Jun. 26, 2007

(86) PCT No.: PCT/KR2007/003099
§ 371 (c)(1),
(2), (4) Date: Dec. 7, 2010

(87) PCT Pub. No.: WO2009/001973
PCT Pub. Date: Dec. 31, 2008

(65) Prior Publication Data
US 2011/0070039 A1     Mar. 24, 2011

(51) Int. Cl.
*B23B 27/22* (2006.01)
*B23B 27/00* (2006.01)
(52) U.S. Cl. ........... 407/113; 407/114
(58) Field of Classification Search .......... 407/113, 407/114, 115, 116
See application file for complete search history.

(56) References Cited

U.S. PATENT DOCUMENTS

| | | | |
|---|---|---|---|
| 5,044,840 A * | 9/1991 | Fouquer et al. | 407/114 |
| 5,122,017 A | 6/1992 | Niebauer | |
| 5,222,843 A * | 6/1993 | Katbi et al. | 407/114 |
| 5,230,591 A | 7/1993 | Katbi et al. | |
| 5,476,346 A | 12/1995 | Lundström | |
| 6,065,907 A | 5/2000 | Ghosh et al. | |
| 6,123,488 A | 9/2000 | Kasperik et al. | |
| 6,234,726 B1 | 5/2001 | Okada et al. | |
| 6,957,935 B2 * | 10/2005 | Sung et al. | 407/113 |
| 2008/0219784 A1 * | 9/2008 | Yamazaki et al. | 407/114 |
| 2008/0232912 A1 | 9/2008 | Bhagath | |

OTHER PUBLICATIONS

International Search Report in PCT/KR2007/003099, dated Mar. 4, 2008.
Written Opinion in PCT/KR2007/003099, dated Mar. 4, 2008.

* cited by examiner

*Primary Examiner* — Will Fridie, Jr.
(74) *Attorney, Agent, or Firm* — Womble Carlyle

(57) ABSTRACT

A cutting insert has an upper surface, a lower surface, a plurality of side surfaces connecting the upper surface and the lower surface and a central hole formed at a central portion thereof. The cutting insert has a flat seating surface formed on a highest level of the upper surface, a plurality of side cutting edge portions formed at intersections of the upper surface and the side surfaces, and a corner cutting edge portion formed at an intersection of two adjacent side cutting edge portions and having a cutting edge formed at a front end thereof. A land portion, a downward inclined surface, a corner bottom surface, a first protrusion, an upward inclined surface and the seating surface are formed on the corner cutting edge portion sequentially along a diagonal line directed from the cutting edge to the central hole. A pair of second protrusions are formed and disposed symmetrically on both sides of the diagonal line so that the corner bottom surface is surrounded by the downward inclined surface, the first protrusion, and the second protrusions, and the corner bottom surface has the smallest height and the seating surface has the largest height along the diagonal line.

16 Claims, 3 Drawing Sheets

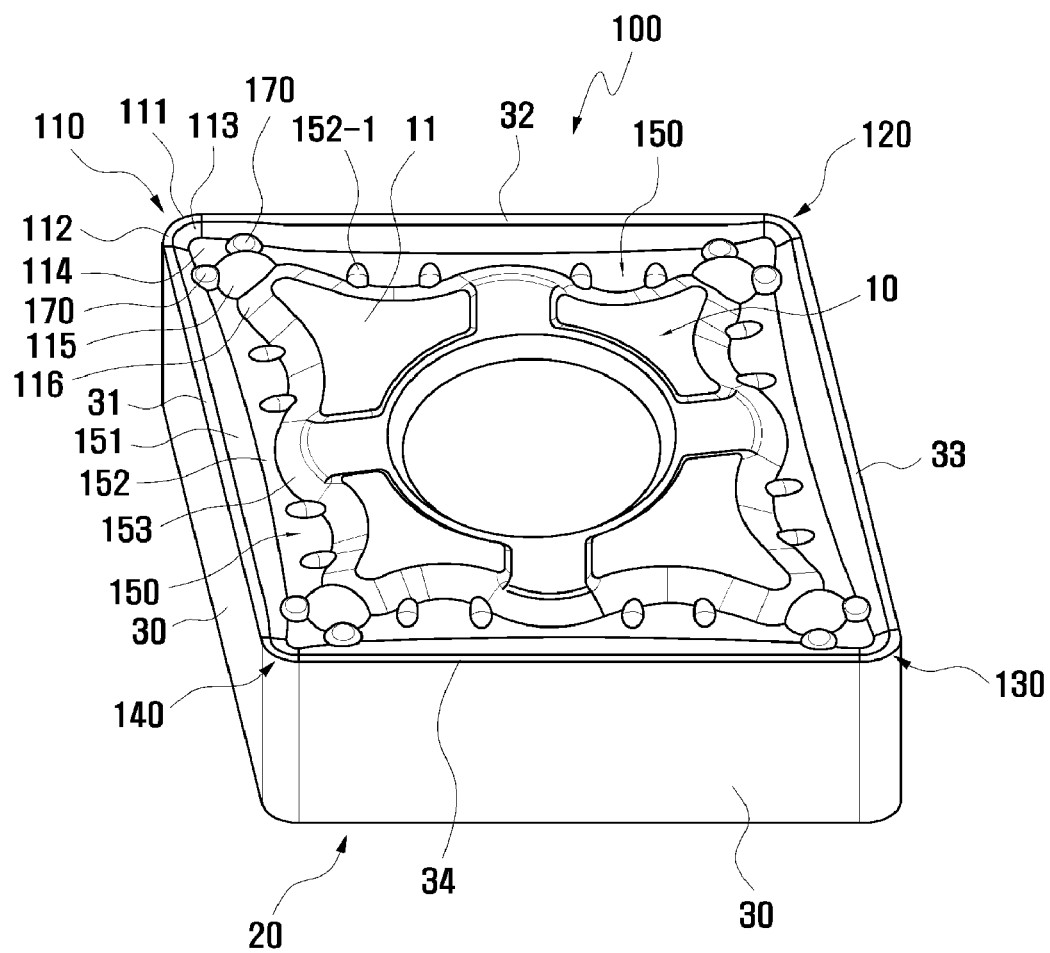
[Fig. 1]

[Fig. 2]
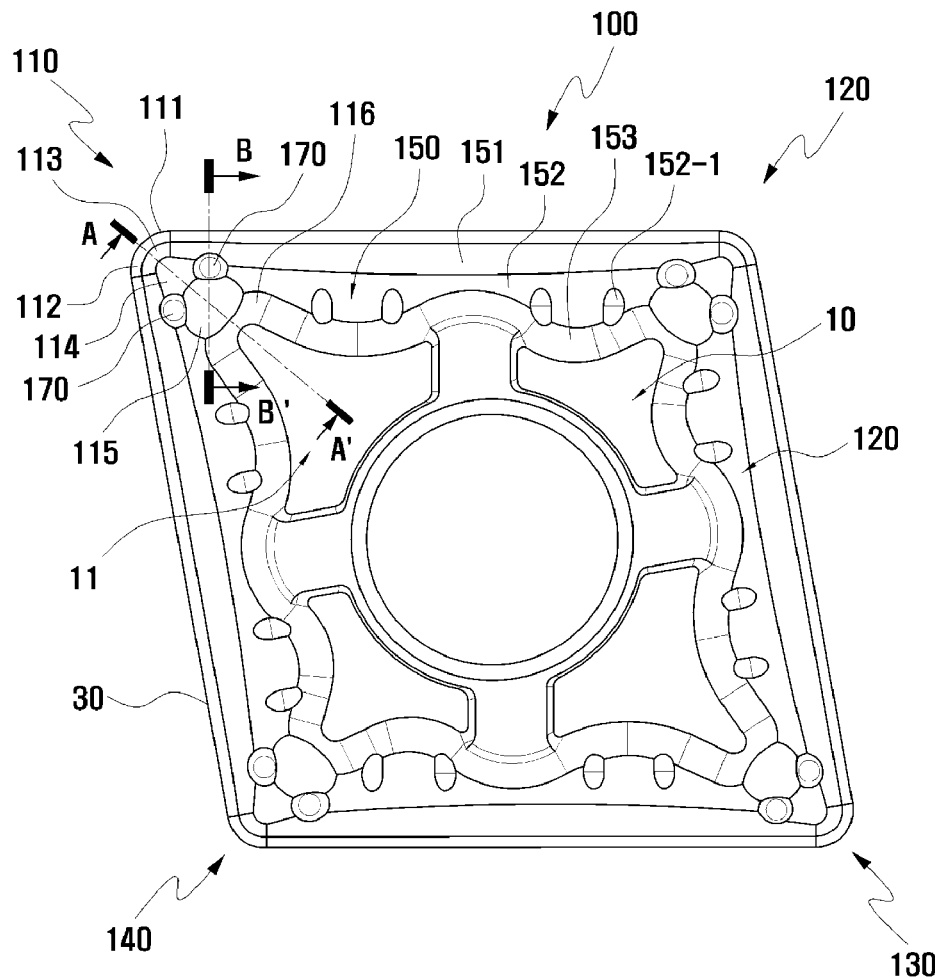
[Fig. 3]
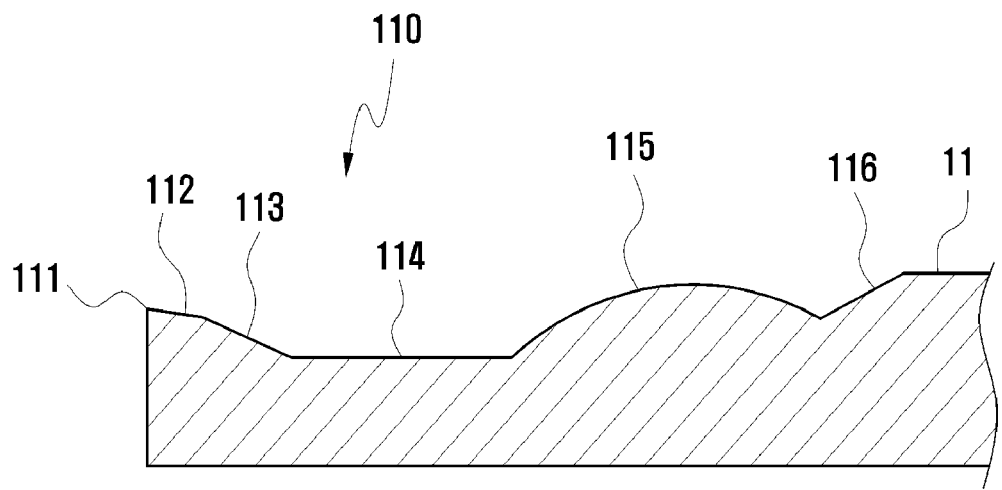

[Fig. 4]
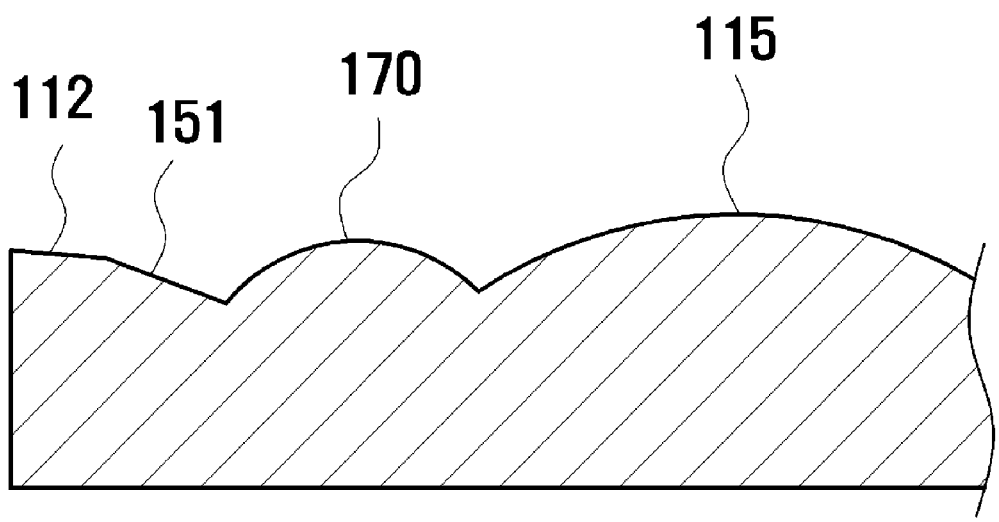

CUTTING INSERT WITH PROTRUSIONS FORMED AT CORNER AREA THEREOF

TECHNICAL FIELD

The present invention relates to a cutting insert, more particularly, to a cutting insert having a structure being capable of controlling effectively chips generated on a work-piece at the time of performing a cutting process for the work-piece.

BACKGROUND ART

In general, a machining tool is used in the field of cutting machining such as drilling, milling, and turning. Within the fields of drilling and milling, a tool having a rotary character is useful for machining a fixed and movable work-piece.

On the contrary, a machining tool for turning machining is fixed and has the purpose of machining work-piece which is rotating. In general, the machining tool comprises a tool holder and a cutting insert fixed to a mounting surface of the tool holder through a clamping means and contacted with the work-piece.

When a turning machining in which the machining tool is utilized is performed, chips generated on the work-piece by the cutting insert should be separated and removed naturally from the rotating work-piece. If the chips exist between the cutting insert and the work-piece, a surface of the rotating work-piece is influenced by the chips. The above phenomenon is described in more detail as follows.

The effective removal of the generated chips to a large extent depends on the design of cutting insert for controlling effectively the chip. It is preferable that the generated chips are diverted from the cutting area by being deformed, split or broken into relatively short chips with minimal energy consumption and with effective heat dissipation.

To this end, a cutting insert with suitably formed depressions or grooves or a cutting insert with protrusions near the cutting edge which is designed to deform, split or break the chip with minimal energy consumption and with effective heat dissipation is provided.

However, an effective control of chip orientation depends on the positioning of the cutting insert in the tool due to the specific shape of the chip forming groove and a smooth transition between different portions of the chip forming groove.

Thus, the chips formed by the cutting edge will be deflected in the direction toward, rather than away from the work-piece due to the cutting insert positioned in the tool at negative rake angles. Consequently, the work-piece and the tool may be damaged by the chips.

In particular, to machine mild steel generating chips which are difficult to control (that is, not bent easily), the serrated cutting insert is required. In addition, the cutting insert which can remove easily the chips and minimize a cutting load under the machining conditions of a low feed rate and a high depth of cut is required.

SUMMARY OF THE INVENTION

Accordingly, the present invention is conceived to solve the aforementioned problems caused by a structure of the cutting insert of the machining tool, an object of the present invention is to provide a cutting insert for a machining tool having a structure being capable of controlling effectively chips generated on a work-piece.

According to the present invention, a polygonal cutting insert having an upper surface, a lower surface, a plurality of side surfaces connecting the upper surface and the lower surface and a central hole formed at a central portion thereof is characterized in that a flat seating surface is formed on a highest level of the upper surface; a plurality of side cutting edge portions are formed at intersections of the upper surface and the side surfaces; a corner cutting edge portion is formed at an intersection of two adjacent side cutting edge portions, the corner cutting edge portion has a cutting edge formed at a front end thereof; a land portion, a downward inclined surface, a corner bottom surface, a first protrusion, an upward inclined surface and the seating surface are formed on the corner cutting edge portion sequentially along a diagonal line directed from the cutting edge to the central hole; a pair of second protrusions are formed and disposed symmetrically on both sides of the diagonal line so that the corner bottom surface is surrounded by the downward inclined surface, the first protrusion, and the second protrusions; and the corner bottom surface has the smallest height and the seating surface has the largest height along the diagonal line.

In the cutting insert according to the present invention, the first protrusion and the second protrusion are part-spherical in shape and the height of the first protrusion is larger than that of the second protrusion. Also, the first protrusion has a height larger than that of the corner cutting edge, and the second protrusion has a height larger than that of the corner cutting edge.

On the other hand, the land portion, a downward-grooved surface, a side bottom surface and an upward-grooved surface are formed sequentially in a direction from the side cutting edge of the side cutting edge portion to the inner part of the insert, and the side bottom surface has a height smaller than that of the corner bottom surface.

In addition, in the cutting insert according to the present invention, the side bottom surface has a ridge formed thereon and extended from the upward-grooved surface toward the side cutting edge of the side cutting edge portion.

The cutting insert according to the present invention having the structure and function as described above can control the chip under the conditions of a low cut depth and a high cut depth and can machine the work-piece with a low cutting force.

BRIEF DESCRIPTION OF THE DRAWINGS

FIG. 1 and FIG. 2 are perspective view and plane view of a cutting insert according to the present invention;

FIG. 3 is a sectional view taken along the line A-A in FIGS. 2; and

FIG. 4 is a sectional view taken along the line B-B in FIG. 2.

DETAILED DESCRIPTION

Hereinafter, the present invention is described in detail with reference with the accompanying drawings.

FIG. 1 and FIG. 2 are perspective view and plane view of a cutting insert according to the present invention and show a cutting insert having a structure being capable of controlling effectively chips generated on a work-piece.

A cutting insert 100 includes an upper surface 10, a lower surface 20 and side surfaces 30, each of four (4) corner cutting edge portions 110, 120, 130 and 140 is formed at an intersection between two adjacent side cutting edge portions (for example, 31 and 32).

As one example, the cutting insert 100 is an equilateral parallelogram member having a certain angled diamond shape. That is, as shown in FIG. 2, one side surface 30 of the cutting insert 100 has a certain acute angle with respect to an adjacent side surface.

The upper surface 10 and the lower surface 20 of the cutting insert 100 are formed with a substantial plane seating surface 11, this seating surface 11 is preferably protruded above the corner cutting edge portions 110, 120, 130 and 140. The seating surface 11 serves as an insert supporting surface when the cutting insert 100 is mounted on the cutting tool.

Detailed structure of the corner cutting edge portions 110, 120, 130 and 140 of the cutting insert 100 constructed as described above is described below. In the below description, for the sake of convenience, one corner cutting edge portion 110 is illustrated as an example.

FIG. 3 is a sectional view taken along the line A-A in FIG. 2 and FIG. 4 is a sectional view taken along the line B-B in FIG. 2. FIG. 3 and FIG. 4 show a structure of one corner cutting edge portion 110 and a structure of a part of the side cutting edge portion 32 adjacent to the corner cutting edge portion 110, respectively.

The corner cutting edge portion 110 formed at an intersection portion of two adjacent side cutting edge portions 31 and 32 has a corner cutting edge 111 formed at a front end thereof. A land portion 112 is formed on an upper surface over a certain width at the immediate inside of the corner cutting edge 111.

A first inclined surface 113 with a certain width and an incline angle is formed at an inner side of the land portion 112, and a corner bottom surface 114 with a certain width is formed at an inner side of the first inclined surface 113. Based on the land portion 112, the first inclined surface (downward inclined surface) 113 is inclined downward toward an inner side, and so the height of the corner bottom surface 114 is smaller than that of the corner cutting edge 111.

A first protrusion 115 with a certain area is formed at an inner side of the corner bottom surface 114. A height of the first protrusion 115 is larger than that of the corner cutting edge 111 and the first protrusion is part-spherical in shape.

The first protrusion 115 and the seating surface 11 of the upper surface 10 are linked to each other through a second inclined surface 116. Based on the first protrusion 115, the second inclined surface 116 (upward inclined surface) is inclined upward toward the seating surface 11.

Here, the first land portion 112, the first inclined surface 113, the corner bottom surface 114, the first protrusion 115 and the second inclined surface 116 are disposed sequentially on a diagonal line crossing the corner cutting edge 111 and a center portion of the cutting insert 100.

On the other hand, second protrusions 170 are formed at both border sides of the corner bottom surface 114, respectively. The size (height and diameter) of the second protrusion 170 is smaller than that of the first protrusion 115, and two second protrusions 170 are disposed symmetrically about the diagonal line of the cutting insert 110.

In the corner cutting edge portion 110, due to the above structure, the corner bottom surface 114 is surrounded with the first protrusion 115, two second protrusions 170 and the first inclined surface 113.

In addition, a groove 150 is formed on a region of each of the side cutting edge portions 31, 32, 33 and 34 (that is, a region between two adjacent corner cutting edge portions (for example, 120 and 130) by a downward-grooved surface 151, a side bottom surface 152 and an upward-grooved surface 153.

Functions of each structural element constituting the cutting insert 100 according to the present invention as described above are described as follows.

A recess with a certain volume is formed by the first protrusion 115, the second protrusions 170 adjacent to the first protrusion 115, the first inclined surface 113 and the corner bottom surface 114. Due to this recess, it is possible to control smoothly the chips under various conditions and to increase the life span of the cutting insert by reducing cutting resistance.

The first protrusion 115 and the second protrusions 170 are part-spherical in shape, the first protrusion 115 is disposed on the diagonal line and the second protrusions 170 are symmetrically disposed at both sides of the first protrusion 115. Due to the first and second protrusions 115 and 170 having a part-spherical shape, it is possible to minimize a friction force between the chip and each protrusion and to prevent the chip from being melted and bonded on a surface of the protrusion. Further, according to the part-spherical, a surface area of the protrusion becomes maximized, and so it is possible to maximize a heat transferred to the chip, and therefore heat transfer to the cutting insert can be minimized. In addition, due to a characteristic of the part-spherical shape, even if the chips are guided to any direction, the first and second protrusions 115 and 170 function as intended.

On the other hand, if a depth of cut is smaller than that allowed by the second protrusion, the chips generated by the corner cutting edge 111 come into collision with the corner bottom surface 114. Then, the chip is collided with the first protrusion 115 and guided to the non-active cutting edge. The chip is then collided with the second protrusions 170 near to the non-active cutting edge and broken into chip pieces with appropriate lengths. As described above, the second protrusions 170 prevent the non-active cutting edge from directly being contacted by the chip and so the life span of the cutting insert can be increased.

On the contrary, in a case where the work-piece is cut under the condition of a depth of cut that is larger than that allowed by the second protrusion 170, the chips generated by the corner cutting edge 111 and the side cutting edge are primarily controlled by the corner bottom surface 114 and the second protrusions 170 and is ultimately controlled by the first protrusion 115 and the second inclined surface 116.

At this time, the chip is rapidly bent by a shear stresses difference in the lengthwise direction of the chip caused by the corner bottom surface 114 and the second protrusions 170. Then, the chip comes into contact with the first protrusion 115. Here, due to the first protrusion 115 having the part-spherical shape, a minimum resistance is generated between the chip and the first protrusion 115, and so it is possible to control easily the chip.

The second protrusion 170 is formed such that the center of the second protrusion 170 is spaced apart from an end of the corner cutting edge 111 in the lengthwise direction of the side surface by a certain distance, preferably, 0.2 mm or more, most preferably 0.4 to 2.0 mm. If the second protrusion 170 is extremely close to the corner cutting edge 111, a space in which the chip is formed is not sufficient so that the chip can not be controlled easily.

A center of the first protrusion 115 is spaced apart from a center of the second protrusion 170 in the lengthwise direction of the side surface 30 by a certain distance of 1.5 mm or less, preferably, 0.7 mm or less. This distance depends on a size of the corner cutting edge portion 110 and an angle between the adjacent side surfaces 30 of the cutting insert 100. If a distance between the first protrusion 115 and the second protrusion 170 is excessively large, the chip contacts primarily with either one of the protrusions and, in this state, the chips cannot be controlled properly.

As described above, on the other hand, it is preferable that a height of the second protrusion 170 is larger than that of the corner cutting edge 111. If the height of the second protrusion 170 is smaller than that of the corner cutting edge 111, although a resistance between the chip and the second protrusion 170 may be reduced to some extent, it is difficult to control properly the chip under the condition of a small cut depth.

In particular, since the chip separated from the work-piece received a pressure required for controlling the chip and the cutting resistance has been absorbed to some extent by the corner bottom surface 114, it is better then to secure a chip control function than to reduce the resistance. Accordingly, it is preferable that the height of the second protrusion 170 is larger than that of the corner cutting edge 111.

In addition, if the height of the second protrusion 170 is smaller than that of the corner cutting edge 111, the life span of the cutting insert may be reduced because the guided chip can collide with the non-active side cutting edge portion of the side surface 30

The first protrusion 115 has a height larger than that of the corner cutting edge 111, preferably, a height larger than that of the corner cutting edge 111 by 0.03 mm to 0.2 mm. The first protrusion 115 having the above condition guides the chip which is controlled on the second protrusions 170 to the corner portion on which the chip is more easily controlled and generates larger stress on the chip, and so the first protrusion makes it easy to control the chip.

On the other hand, the first protrusion 115 has a height larger than that of the second protrusion 170. If the second protrusion 170 has a height larger than that of the first protrusion 115, it becomes difficult to expect the effective chip control.

A vertical distance (depth) between the corner cutting edge 111 and the corner bottom surface 114 is smaller than a depth of the groove 150 formed on each of the side cutting edge portions 31, 32, 33 and 34. In this structure, a shear stress is rapidly generated on the chip generated under the condition of a low cut depth so that the chip is more easily controlled on each of the corner cutting edge portions 110, 120, 130 and 140; while shear stress is differently distributed through the entire length of the chip generated under the condition of a high cut depth, and so the chip can be smoothly curled.

On the other hand, ridges 152-1 with a certain height are formed on the bottom surface of 152 of the groove 150 formed at each of the side cutting edge portions 31, 32, 33 and 34. Each ridge 152-1 is extended from the upward-grooved surface 153 toward the side cutting edge of the side cutting edge portion. The ridges 152-1 make the chip generated under the condition of a high cut depth to be more curled to make it easy to control the chip.

Although the preferred embodiment has been described with reference to the preferred embodiment thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

The cutting insert according to the present invention having the structure and function as described above can control the chip under the conditions of a low cut depth and a high cut depth and can machine the work-piece with a low cutting force.

We claim:

1. A polygonal cutting insert having an upper surface, a lower surface, a plurality of side surfaces connecting the upper surface and the lower surface and a central hole formed at a central portion thereof, wherein:
    a flat seating surface is formed on a highest level of the upper surface;
    a plurality of side cutting edge portions are formed at intersections of the upper surface and the side surfaces;
    a corner cutting edge portion is formed at an intersection of two adjacent side cutting edge portions, the corner cutting edge portion has a corner cutting edge formed at a front end thereof;
    a land portion, a downward inclined surface, a corner bottom surface, a first protrusion, an upward inclined surface and the seating surface are formed on the corner cutting edge portion sequentially along a diagonal line directed from the corner cutting edge to the central hole;
    a pair of second protrusions are formed and disposed symmetrically on both sides of the diagonal line so that the corner bottom surface is surrounded by the downward inclined surface, the first protrusion, and the second protrusions; and
    the corner bottom surface has the smallest height and the seating surface has the largest height along the diagonal line.

2. The cutting insert according to claim 1, wherein the first protrusion and the second protrusion are part-spherical in shape and the height of the first protrusion is larger than that of the second protrusion.

3. The cutting insert according to claim 2, wherein the first protrusion has a height larger than that of the corner cutting edge.

4. The cutting insert according to claim 2, wherein the second protrusion has a height larger than that of the corner cutting edge.

5. The cutting insert according to claim 1, wherein the land portion, a downward-grooved surface, a side bottom surface and an upward-grooved surface are formed sequentially in a direction from a side cutting edge of the side cutting edge portion to an inner part of the insert.

6. The cutting insert according to claim 5, wherein the side bottom surface has a height smaller than that of the corner bottom surface.

7. The cutting insert according to claim 6, wherein the side bottom surface has a ridge formed thereon and extended from the upward-grooved surface toward the side cutting edge of the side cutting edge portion.

8. The cutting insert according to claim 2, wherein the land portion, a downward-grooved surface, a side bottom surface and an upward-grooved surface are formed sequentially in a direction from a side cutting edge of the side cutting edge portion to an inner part of the insert.

9. The cutting insert according to claim 3, wherein the land portion, a downward-grooved surface, a side bottom surface and an upward-grooved surface are formed sequentially in a direction from a side cutting edge of the side cutting edge portion to an inner part of the insert.

10. The cutting insert according to claim 4, wherein the land portion, a downward-grooved surface, a side bottom surface and an upward-grooved surface are formed sequentially in a direction from a side cutting edge of the side cutting edge portion to an inner part of the insert.

11. The cutting insert according to claim 1, wherein:

the cutting insert comprises an equilateral parallelogram member.

12. The cutting insert according to claim 11, wherein:

the first protrusion has a height larger than that of the second protrusions; and the first protrusion and the second protrusions both have heights larger than that of the corner cutting edge.

13. The cutting insert according to claim 11, wherein:

the first protrusion and the second protrusions are part-spherical in shape.

14. The cutting insert according to claim 13, wherein:

one of said second protrusions is located between the first protrusion and a side cutting edge portion associated with said one of said second protrusions; and a center of the first protrusion and a center of said one of said second protrusions are spaced apart by a distance of 1.5 mm or less.

15. The cutting insert according to claim 14, wherein:

the center of said one of said second protrusions is spaced apart from an end of the corner cutting edge in a lengthwise direction of the side surface by 0.4 to 2.0 mm.

16. The cutting insert according to claim 13, wherein:

a center of said one of said second protrusions is spaced apart from an end of the corner cutting edge in a lengthwise direction of the side surface by 0.4 to 2.0 mm.

* * * * *